J. L. GISH.
AUTOMOBILE TIRE.
APPLICATION FILED OCT. 9, 1913.

1,118,122.

Patented Nov. 24, 1914.
3 SHEETS—SHEET 1.

Witnesses.
Anna Gish
Carl H. Gish

Inventor.
John L. Gish

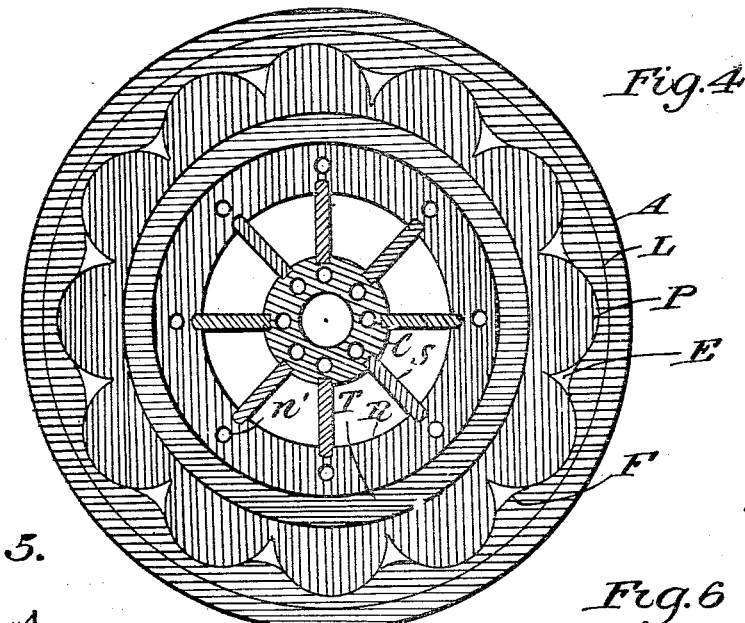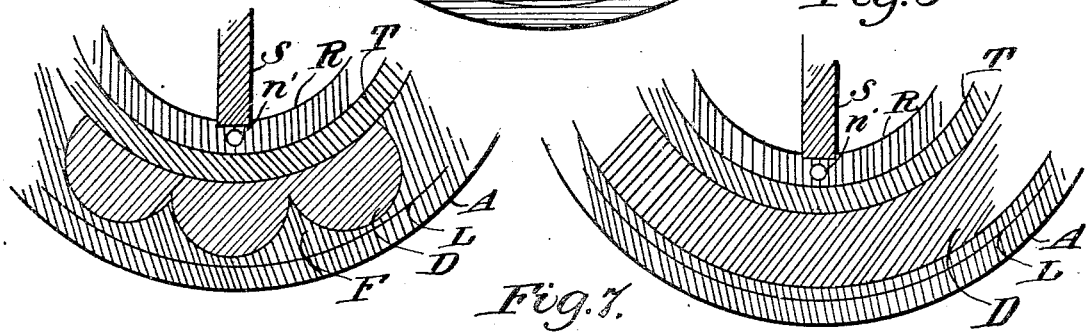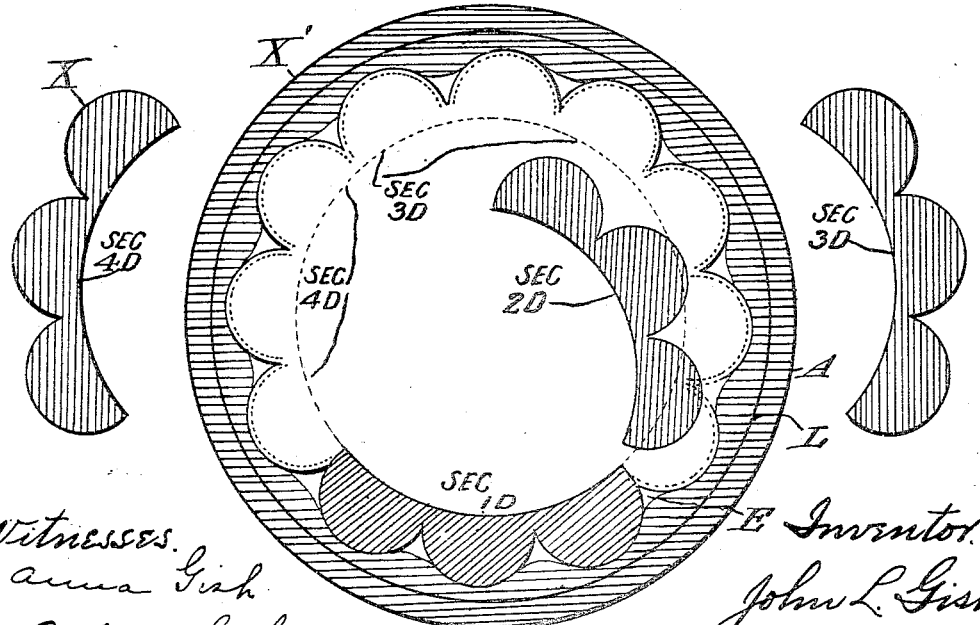

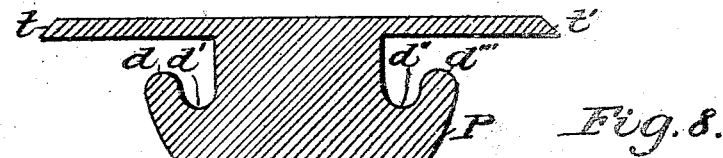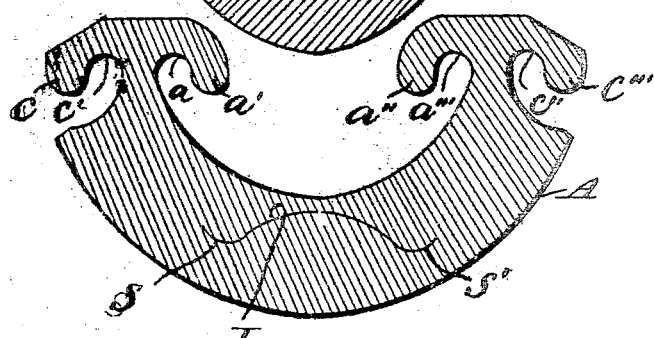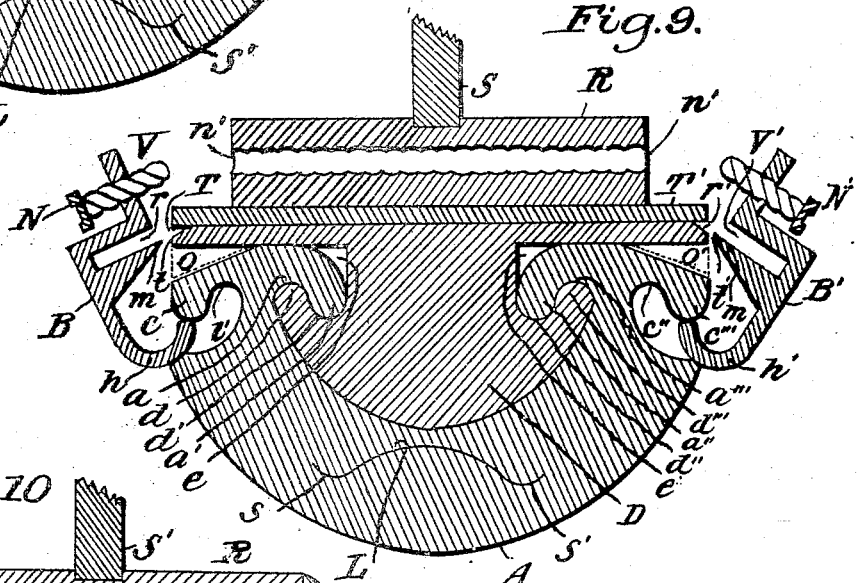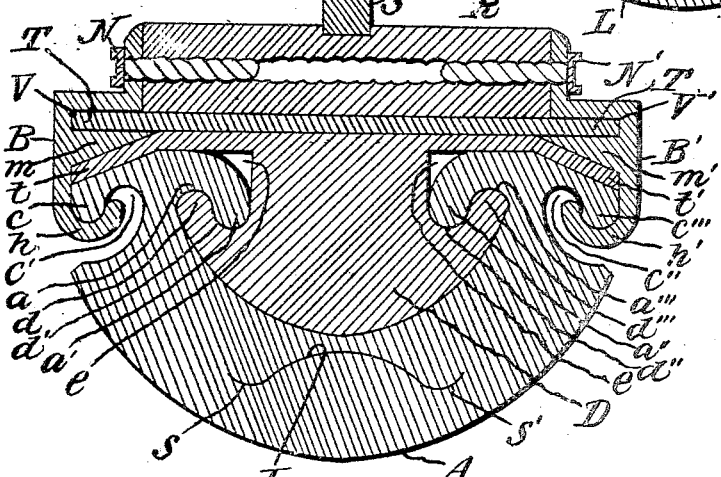

UNITED STATES PATENT OFFICE.

JOHN LINCOLN GISH, OF SOUTH BEND, INDIANA.

AUTOMOBILE-TIRE.

1,118,122.  Specification of Letters Patent.  Patented Nov. 24, 1914.

Application filed October 8, 1913.  Serial No. 794,105.

*To all whom it may concern:*

Be it known that I, JOHN LINCOLN GISH, a citizen of the United States, residing at South Bend, in the county of St. Joseph and State of Indiana, have invented a new and useful Automobile-Tire, of which the following is a specification.

The object of my present invention is to construct an automobile tire in such a manner, firstly, that the said automobile tire will have a flexible, solid, inner core or tire; secondly, an outer resistance tire or tread; thirdly, a removable flange, which engages the resistance tire, and automatically locks an inner rim, of the resistance tire, to the inner tire, as the said flange securely fastens, both the inner and outer tires, to the automobile wheel; fourthly, that the said tire will prevent rim-cutting. blow-outs, and tread separation, and still have the resiliency of a pneumatic tire.

Figure 1:
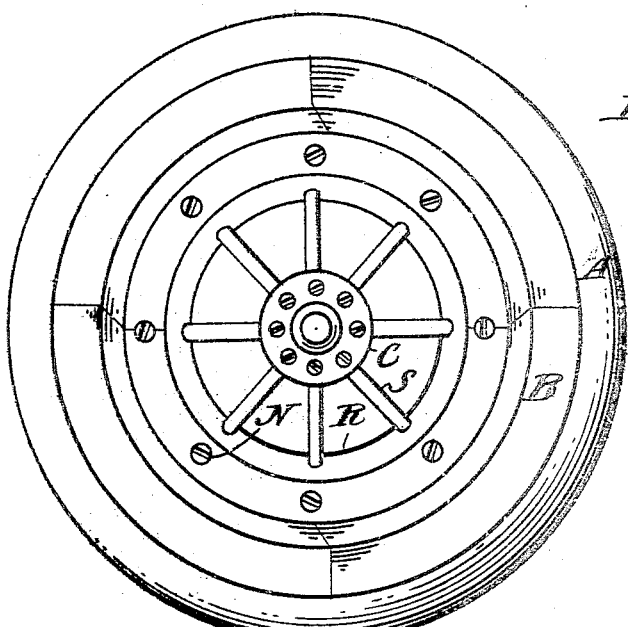

Figure 1., is the automobile tire, in position, on the automobile wheel C S R.

Figure 2:
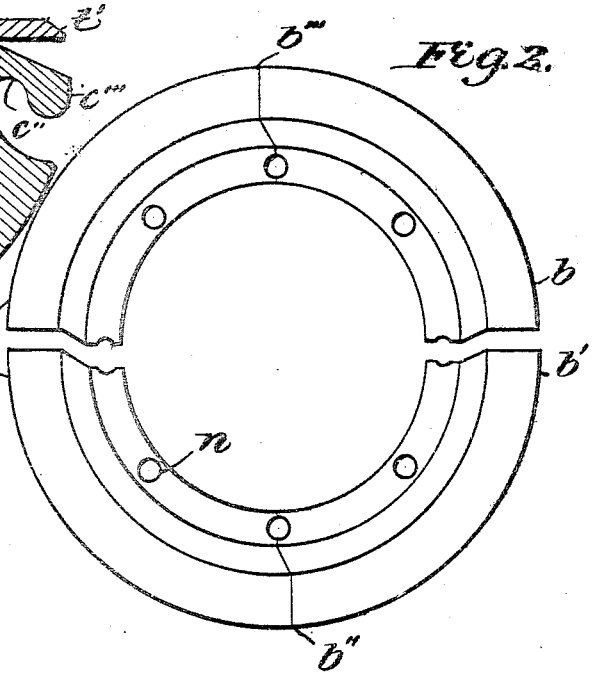

Fig. 2., is the outer face or surface, of the removable flange B., *b.*, and *b'.*, are the divided sections of flange B., *b"*, and *b'''*., show that the flange B., may be divided into more than two sections.

Figure 3:
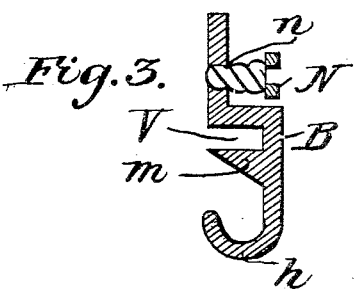

Fig. 3., is a cross section of flange B., showing the bolt N., engaged in the hole *n.*, also the slot *v*, the wedge-shaped projection *m*., and the hook shaped projection *h*., representing very important points on the inner face, of the said flange B.

Fig. 4., is a vertical section of Fig. 1., in the median line, of which D., is the inner tire, A., is the outer tire, E., is an air space in the transverse line of the tire; F., is the convoluted inner surface of the outer tire A.

Fig. 5., is a part of the vertical section of Fig. 1., in the median line, showing a modified form of the convoluted (F., see Fig. 4.) inner surface of the outer tire A., whereby the air space (E., see Fig. 4.) is eliminated.

Fig. 6., is a part of a vertical section of Fig. 1., in the median line, showing a modified form of the outer surface of the inner tire D., and the inner surface of the outer tire A., whereby the involuted outer surface of the inner tire D., and the convoluted inner surface of the outer tire A., are eliminated.

Fig. 7., is a vertical section, in the median line of the outer tire A., showing vertical sections in the median line, of section 1., of the inner tire D., in its respective position, section 2., of the inner tire D., partly in its respective position, while sections 3., and 4., of the inner tire D., are shown on the outside of the outer tire A.; but when sections 2., 3., and 4., are in their respective places, they will occupy positions indicated by the dotted lines, on the inside of the outer tire A.; Fig. 7., also shows, that the inner tire D., may be made in one continuous piece, as indicated by the dotted line, or the inner tire D., may be made in one or more sections, all of which, are readily removed or replaced, from or in, their respective places.

Fig. 8., is a cross section of the inner tire D., and the outer tire A., separated from each other. The cross sections of D., and A., are made at points on the tires, corresponding to points X., and X'., see Fig. 7.

Fig. 9., is a cross section of the outer tire A., and the inner tire D., (as shown in Fig. 8.) in their respective position to each other, and in position, on the cross section of the rim R., and the tire T., of the automobile wheel C S R.; also a cross section of the removable flange B., partly in position, is shown in Fig. 9.

Fig. 10., is a cross section of the inner tire D., and the outer tire A., and the removable flange B., in their respective operative positions, firmly secured, by the bolt N., to the cross section of the rim R., and the tire T., of the automobile wheel C S R.

Figure 11:

Fig. 11., is a cross section of the inner tire D., and the outer tire A., in their respective positions, showing the convex surface of the breaker strip L., appearing above the inner surface of the outer tire A., and resting in its counterpart, on the outer surface of the inner tire D.

Similar letters, refer to similar parts, throughout the several figures.

C S R.. Fig. 1., is the automobile wheel.
A., is the outer resistance tire or tread.
B., is the removable flange.
*b.*, and *b'.*. Fig. 2., are the divided sections of the flange B.
N., is a bolt.
*n.*. is a hole through the inner circle of the flange B.
*n'*.. is a continuation of the hole *n*., into the rim R.
V., see Fig. 8., is a slot, on the inner surface of flange B.
*m*., see Fig. 8., is a wedge shaped projection on the inner surface of flange B.
*h*., see Fig. 3., is a hook shaped projection, on the inner surface of the flange B.

D., see Fig. 4., is the flexible, solid, inner tire.

E., see Fig. 4., is an air space, in the transverse line of the automobile tire, formed by the involute outer surface of the inner tire D., and the convolute inner surface of the outer tire A.

F., see Fig. 4., is the convoluted inner surface of the outer tire A.

1D., 2D., 3D., and 4D., presents the four sections of the inner tire D., see Fig. 7.

t., and t'., are flexible arms, of the tire D.

d., and d'''., are flexible rims, of the tire D.

d'., and d''., are flexible grooves, of the tire D.

c., and c'''., are the external rims, of the tire A.

c'., and c''., are grooves, formed on the external surface of the tire A.

a'., and a''., are the internal rims of the tire A.

a., and a'''., are grooves, formed on the inner surface of the tire A.

T., and T'., represent the iron tire of the automobile wheel C S R., bearing a greater width, than the rim R. The extended portion of the iron tire T., T'., is made to engage the slot V., of the removable flange B.

e., and e'., are two, encircling air spaces, within the automobile tire, formed to a greater degree, or to a lesser degree, than shown in Figs. 9., and 10., according to, and corresponding to, the increase or the decrease, of the curvature, of the inner line, of the inner rim a'., and of the inner rim a''., of the outer tire A.

L., is a breaker strip, provided with a special convex surface ending with reverse curved terminals s., and s'., said convex surface, placed toward the inner surface of the outer tire A.

The special features of my automobile tire are; first,—a removable flange B., divided into sections b., and b'., said flange B., also provided with a hook h., a wedge m., and a slot V.;—second, a flexible, solid, inner tire D., made of any suitable material, and into sections 1D., 2D., 3D., and 4D., said tire D., also provided with an involuted outer surface, arms t., and t'., rims d., and d'''., and grooves d'., and d''.;—third, an outer resistance tire or tread A., made of any suitable material, and provided with a convoluted inner surface, external rims c., and c'''., external grooves c' and c''., internal rims a'., and a''., and internal grooves a., and a'''.;—fourth, an air space E., in the transverse line of the automobile tire: fifth, the two, encircling air spaces e., and e'., within the automobile tire;—sixth, an automatic locking of the inner rims a'., and a''., of the outer tire A., into the inner grooves d'., and d''., of the inner tire D., by means of the arms t., and t'., and the wedges m., and m'., as the said flange B., securely fastens, both the inner tire D., and the outer tire A., to the automobile wheel C S R.;—seventh, no rim-cutting;—eighth, no tread separation.

Referring to the air spaces E., in the transverse line of the tire, formed, by and between, the involute outer surface of the tire D., and the convolute inner surface of the tire A., and also, to the two, encircling air spaces e., and e'., formed, by and between, the special structure of the inner rims a'., and a''., of the outer tire A., and the grooves d'., and d''., of the inner tire D., and which air spaces are automatically formed and hermetically closed, by the placing together of the various parts, which make up the automobile tire, ready for use and service, it is readily seen, that the air spaces confine the air, inclosed therein, and provide air cushions, which gives to the automobile tire, the resiliency, of a pneumatic tire or tube.

The rim-cutting is prevented by means of the open external grooves c'., and c''., which affords a free and easy clearance for the hooks h., and h'. The hook h., being in its respective operative position, firmly holds the external rim c., and practically allows no lateral motion to said rim c., but does admit of a limited amount of motion, to said rim c., in the vertical line, by reason of the compressibility of the arm t.; as this vertical motion takes place, the external groove c'., provides a free clearance for the end and side of the said hook h., and thereby prevents undue friction at this point. When the load upon the automobile tire is sufficient, to bring the greater curve of the said external groove c'., in contact, with the greater curve of the hook h., the edge of the tire A., at the opening of the external groove c'., is deflected outward, and only a contact of surfaces is made, with no injury to the tire A.

The tread separation is prevented by the convex surface or line L., formed by a breaker strip made of any suitable material and placed at the base of the tread: said breaker strip is provided with a convex surface L., which is placed, with the convexity, toward the inner surface of the outer tire A., as shown in Figs. 8., 9., and 10., whereby the inner buckling or the inward knuckling, at the medium line of the outer tire A., is prevented, and thereby distributing the force of contact, at all times, over the full width of the tread. This said convex surface or line L., may be placed, so as to appear, above the inner surface, of the outer tire A., as seen in Fig. 11.

With the parts thus mentioned and described my automobile tire is assembled for operative work, as follows,—The outer resistance tire or tread A., the flexible, solid, inner tire D., and the removable flange B., having been made, as described above, of any suitable material, and proportioned for the service demanded of each part,—take the outer tire A., and place, section 1D., see Fig. 7., in its respective position, by gently forcing the internal rims a'., and a''., into the flexible groove, d'., and d''., and in so doing, the flexible rims d., and d'''., will be forced into the internal grooves a., and a'''., while the body of the tire D., will take its respective position, within the body of the tire A., and present relation of parts, as seen in the median, vertical line, Fig. 7., and the cross section, Fig. 9. The section 1D., being in place,—sections 2D., 3D., and 4D., are similarly placed. This having been accomplished, the next step is to place the outer tire A., containing the inner tire D., into its place, upon the automobile wheel C S R., which is done, by gently sliding the inner surface of the tire D., over the outer surface of the iron tire T., T'., and present relation of parts, as seen in Fig. 9. The next and final step is to lock tires D., and A., into each other, and securely fasten the same to the rim R., and this is accomplished by means of the removable flange B., as follows,—the flange B., preferably made in two sections b., and b'., allows you to take one section, and by a little manipulation, the hook h., Fig. 9., soon engages the external groove c'.,—as the flange B., is brought into an upright position, and with an inward direction at the same time, the point of the wedge m., engages the notch r., and the opening of the slot v., engages the edge of the tire T.,—as soon as this is accomplished, then by a direct inward motion, the slot V., fully engages the iron tire T., and as the wedge m., is forced into place, between the iron tire T., and the arm t.,—the said arm t., see Fig. 9., is forced downward, in direction, of dotted line o., and at the same time, the rim c., is moved in closer proximity to the arm t., as the hook h., fully engages the external groove c'. As the arm t., is forced downward to the beveled surface of the external rim c., by means of the wedge m., a corresponding pressure is exerted in an inward direction on the arm t., and automatically forces and locks the inner rim a., into the inner groove d., and at the same time, forms and hermetically closes the air space e. As soon as the flange B., is in its proper position, the said flange B., is secured in place, by means of the bolt N., engaging the rim R., and presents relation of parts, as seen in Fig. 10. Having placed one section of flange B., in position, the remaining section is placed,—and then repeating the manipulation for the opposite side of the tire, we will have the automobile tire, as described above, on the automobile wheel, and present relation of parts as seen in Fig. 1.

Therefore, what I do claim as my invention and desire to secure by Letters Patent is,—

1. In a vehicle tire, comprising an outer casing, an inclosed core, and a removable flange,—said flange having a wedge shaped projection adapted to coöperate with a portion of said inclosed core, whereby a part of said outer casing is locked into a corresponding part of said inclosed core, thereby securely fastening the said outer casing to the said inclosed core, as the said flange simultaneously fastens the said outer casing to the rim of a wheel.

2. In a vehicle tire comprising an outer casing, an inclosed core, and a removable flange,—the removable flange having a wedge shaped projection, whereby a portion of said core and a part of said casing, are forced into the space between the said projection and means on said flange adapted to engage said casing, thereby firmly engaging the said core and the said casing to the said flange, as the said flange simultaneously fastens the said casing to the rim of a wheel.

3. In a vehicle tire comprising an outer casing, an inclosed core, and a removable flange,—said flange made in sections and provided with a slot adapted to engage the tire, said flange further provided with a wedge shaped projection adapted to coöperate with a portion of said core, whereby a part of said casing is locked into a corresponding part of said core, thereby securely fastening the said casing to the said core, as the said flange simultaneously fastens the said casing to the rim of a wheel.

In testimony whereof I have signed my name to this specification in the presence of two subscribing witnesses.

JOHN LINCOLN GISH.

Witnesses:
ANNA GISH,
CARL K. GISH.